United States Patent [19]

Marumoto et al.

[11] Patent Number: 4,753,309
[45] Date of Patent: Jun. 28, 1988

[54] ELECTRIC POWER STEERING APPARATUS

[75] Inventors: Katsuji Marumoto; Tsutomu Omae, both of Hitachi, Japan

[73] Assignee: Hitachi, Ltd., Tokyo, Japan

[21] Appl. No.: 881,222

[22] Filed: Jul. 2, 1986

[30] Foreign Application Priority Data

Jul. 3, 1985 [JP] Japan ............................ 60-144784

[51] Int. Cl.$^4$ ............................................ B62D 5/04
[52] U.S. Cl. ........................................... 180/79.1
[58] Field of Search ................... 180/79.1, 141, 142, 180/143, 133

[56] References Cited

U.S. PATENT DOCUMENTS

| | | | |
|---|---|---|---|
| 4,653,601 | 3/1987 | Nakamura et al. | 180/79.1 |
| 4,664,211 | 5/1987 | Oshita et al. | 180/79.1 X |

FOREIGN PATENT DOCUMENTS

| | | | |
|---|---|---|---|
| 189172 | 7/1986 | European Pat. Off. | 180/79.1 |
| 55-76760 | 6/1980 | Japan | 180/79.1 |
| 2130537 | 6/1984 | United Kingdom . | |
| 2145988 | 4/1985 | United Kingdom . | |

Primary Examiner—John J. Love
Assistant Examiner—Charles R. Watts
Attorney, Agent, or Firm—Ladas & Parry

[57] ABSTRACT

An electric power assistance steering apparatus provides a differential compensating circuit (54) in which a command current signal is added with a derivative of the command signal to provide a compensated current signal to a control circuit for varying the current to an electric motor (11) arranged to provide power assistance to a steering rack (6). The apparatus preferably provides signals representative of torque and vehicle speed to a function generator to provide a first command signal which is added with a self-centering command current and the output is provided to give a second command current which is effectively the first command current limited in dependence upon the vehicle speed. The second command current is operated upon by the differential compensating circuit (54) to the compensated current signal.

13 Claims, 5 Drawing Sheets

ELECTRIC POWER STEERING APPARATUS

FIELD OF INVENTION

THis invention relates to an electric power steering apparatus of the type in which an electric motor is used to assist the turning moment of a vehicle steering wheel.

BACKGROUND OF INVENTION

It is known that vehicles of large size and to an increasing extent of medium and even small size are nowadays often epuipped with a power assistance steering to reduce driver effort and hence fatigue so as to thereby ensure improved safety.

Currently, a generally adopted power assistance steering apparatus is of a hydraulic type in which fluid is pumped to assist the movement of a steering rack. However in recent years an electrically driven power assistance steering apparatus such as described in U.S. Pat. No. 4,532,567 has been developed in an attempt to improve controllability and improve the "feel" of a steering wheel to a driver since many known power assistance steering apparatus tend to provide a "dead" feel to a driver which can be dangerous on wet or otherwise slippery road surfaces. Also an electric power assistance steering apparatus has the advantage that it is driven from the vehicle battery and so does not present a drain upon the vehicle engine since it will be readily understood by those skilled in the art that the hydraulic type of power assistance steering is normally driven by a belt from the engine crank shaft to pump the power assisting fluid.

In most of the known electrically driven assistance steering apparatus known to the applicants, an electric motor is employed as an electrical actuator because a large magnitude operating effort is required and the output of the electric motor is reduced by reduction gearing to provide the desired amount of steering assistance. Such an arrangement however leads to an extremely undesirable steering characteristic in that the feel of the steering at the steering wheel is improperly affected due to the inertia of the electric motor and by virtue of the significant frictional resistance produced by the reduction gear mechanism interposed between the electric motor and the steering rack.

In an attempt to improve the feel of the steering and to overcome the inertia of the electric motor and reduction gear mechanism a method of imparting a variable control characteristic to the electric motor is disclosed in Japanese Unexamined Patent Application Publication No. 76760/1980. However in this Japanese Publication the motor current command signal bears a predetermined functional relationship to the torque command derived from the steering wheel so that a compensating value is provided in proportion only to the torque command signal and such an arrangement has been found to involve instabliity in the amount of steering assistance. More specifically the current command signal is taught in the Japanese Publication to vary in a non-linear relationship, such as for example, a quadratic function relative to the torque command signal and the amount of compensation is thus not in direct proportion to the torque command. As a consequence, although the conpensating effect is significant when the torque command has a small magnitude, the compensating effect is reduced as the torque command is increased thereby giving rise to a tendency for the steering assistance to be degraded. Such an arrangement has been found to provide a power assistance steering apparatus in which the driver tends to overturn the steering wheel and he then has to apply a corrected steering movement to compensate for the over-steering operation that he has performed.

OBJECT OF THE INVENTION

It is an object of the present invention to provide an electric power steering apparatus in which improved driver feel is provided. It is a further object of this invention to provide such an electric power steering apparatus in which the amount of steering assisitance is variable with speed so that as speed increases the amount of steering assistance decrease to thereby provide an improved feel to a driver.

SUMMARY OF THE INVENTION

According to this invention there is provided an electric power steering apparatus including an electric motor adapted to provide steering assistance to a vehicle steering mechanism, means for determining a steering function, means for generating a non-linear signal representative thereof, differentiating and summing means adapted to differentiate said non-linear signal to provide a differentiated signal and to sum said non-linear signal with said differentiated signal, the output of said differentiating and summing means being adapted to control the electric motor providing steering assistance.

Preferably vehicle speed detecting means are provided and advantageously the means for generating a non-linear signal is a function generator adapted to recieve inputs from the means for determining a steering function and said vehicle speed detecting means, wherein said function generator is arranged to provide as an output signal said non-linear signal as a first current command signal which is based upon said inputs and which non-linear signal is arranged to decrease as said vehicle speed increases.

Coveniently the function generator is a read-only memory containing a plurality of characteristic curves each having non-linear characteristics and each having a sense of steering direction.

Advantageously said non-linear signal is a first current command signal and preferably the means for detecting a steering function is a torque sensor.

Preferably a steering angle sensor is provided and a generator means is provided for receiving an output from said angle sensor to derive a steering self-centering signal.

In a preferred embodiment an adding means is provided to add the self-centering signal to the first current command signal to provide a second current command signal.

Advantageously there is provided a further read-only memory holding a plurality of characteristic curves and said further read-only memory is adapted to receive inputs from the adding means and the vehicle speed detecting means, said characteristic curves being representative of said second current command signal and the vehicle velocity, whereby a third current command signal varying in dependence upon said further read-only memory inputs and limited to a predetermined maximum level is arranged to be outputted to said differentiating and summing means.

Conveniently the differentiating and summing means is a microprocessor adapted for the calculation Imco(n-

)=Imcp(n)+Imcd(n)=Imc(n)×Kp+[Imc(n-)−Imc(n−1)]×$K_D$ where Imco is the current command output from the differentiating and summing means, Imcd is the differential of Imc, Kp is a constant representative of proportional gain and $K_D$ is a constant representative of differential gain and n is indicative of the present cycle and (n−1) is representative of the immediately previously inputted current command Imco.

Preferably the electric motor is arranged in a feed back control loop and includes a detector adapted to receive the output from the differentiating and summing means to compare said output with the actual motor current whereby a compensating signal in dependence upon said comparison is provided to the motor. Advantageously the compensating signal is derived by controlling the mark-space ratio of the motor control signal with a chopper circuit.

According to a preferred embodiment of this invention there is provided an electric power assistance steering apparatus including an electric motor adapted to provide steering assistance to a steering mechanism, a function generator adapted to generate a non-linear assisting current command value in dependence upon a steering effort applied to a steering wheel, a vehicle speed determining means arranged to vary the output of said function generator in dependence upon said vehicle speed, a current command addition/subtraction circuit for receiving the output from the function generator, a steering angle sensor means, a steering self-centering generator circuit adapted to receive input from the steering angle sensor and to provide output to the current command addition/subtraction circuit whereby the inputs to said current command addition/subtraction circuit are added and outputted to a current command generating circuit for limiting the current command outputted from the addition/subtraction circuit, a differential compensating circuit for performing a differential compensation of the current command value outputted from said current command generating circuit by adding a derivative of said current command value to said current command value and to supply a controlling signal to said electric motor.

BRIEF DESCRIPTION OF THE DRAWINGS

The invention will now be described by way of example with reference to the accompanying drawings in which.

DESCRIPTION OF EXEMPLARY EMBODIMENT

Figure 1:
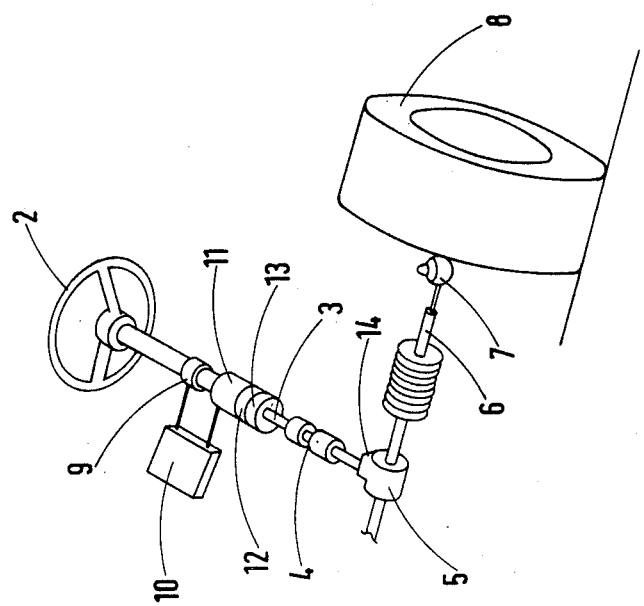
FIG. 1 shows a vehicle in which the general arrangement of the power assistance steering apparatus is located.

Referring to FIG. 1, a vehicle has a steering wheel 2 driving a steering column 3 having an articulated joint 4 and driving by a rack and pinion 5, a steering rack 6 which via ball joints 7 turns the vehicle front wheels 8. Steering column torque and angular sensors 9 together with a speed sensor (not shown in FIG. 1) provide output signals to an electrical control circuit 10 constructed in accordance with this invention. The control circuit 10 provides output signals to an electric DC motor 11 which via a reduction gear mechanism 12 and a clutch 13 is connected to a pinion which also drives the rack 6 in a power assisting capacity. The elements 11, 12, 13, 14 may be clustered around the preexisting steering gear as shown in FIG. 1 or be separately positioned in a parallel path as shown in FIG. 3.

Figure 2:
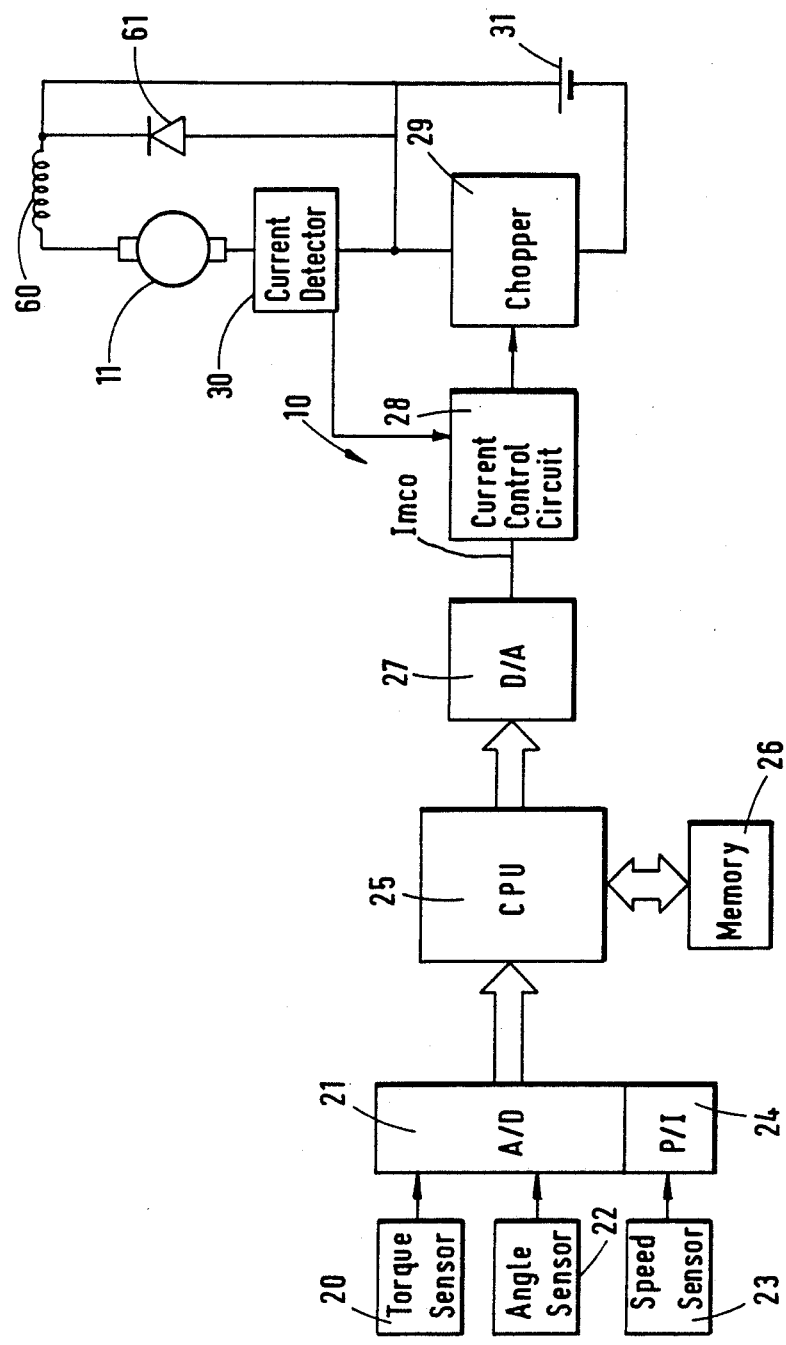
FIG. 2 shows a general block schematic diagram of the electrical circuit used in the apparatus of the invention.

Referring now to FIG. 2, output from a torque sensor 20 which may be similar to the sensor shown in U.S. Pat. No. 4,173,265 representative of a torque signal derived in response to clockwise and counter clockwise rotation of the steering wheel 2 is provided to an analogue/digital converter 21 and output signals from a steering column 3 angle sensor 22 are also applied to the analogue digital converter 21. A speed sensor 23 provides output signals to a vehicle speed circuit 24 arranged to convert magnetic impulse signals from the speed sensor into electrical signals. Output from the analogue/digital converter 21 and vehicle speed circuit 24 is taken to a central processing unit 25 having an interactive memory 26. The output from the central processing unit 25 is reconverted in a digital/analogue converter 27 and inputted to a current control circuit 28. The current control circuit 28 is connected in a feed-back loop with a transistor chopper 29 and a current detector 30, the chopper 29 being arranged to produce a mark-space ratio to drive the electric motor 11 according to the requirements of the motor, such a control circuit being well known per se. The series connection of chopper 29, current detector 30, electric motor 11 and a smoothing choke 60 are connected across the terminals of the vehicle battery 31.

Figure 3:
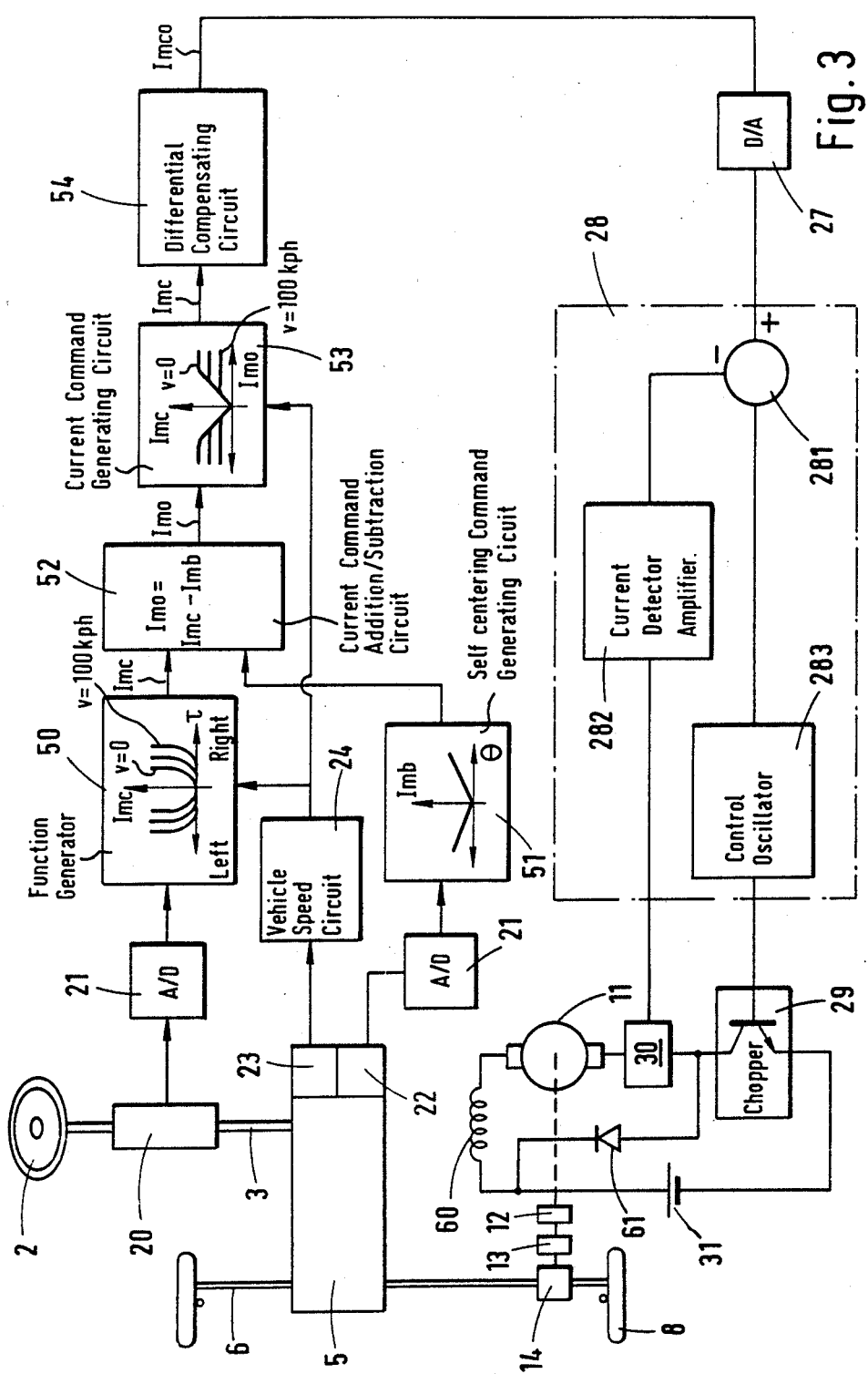
FIG. 3 shows a more detailed block schematic diagram of the electrical circuit shown in FIG. 2 and in which the electrical circuit is shown in combination with elements of the vehicle but modified in form from that shown in FIG. 1.

As shown in FIG. 3 the central processing unit 25 and memory 26 comprise function generator 50, a self-centering command generating circuit 51, a current command addition/subtraction circuit 52, a current command generating circuit 53 and a differential compensating circuit 54.

Having been analogue/digital converter in converter 21 the signal output from the torque sensor 20 is fed to the function generator 50 to generate a non-linear current command value for power assisting effort such that the output of the torque sensor 20 is used to derive the optimal current command for a particular torque sensor output. A signal indicative of the vehicle speed is produced from circuit 24 and fed to the function generator 50 so that the output signal Imc produced by the function generator 50 is varied in accordance with both torque sensed from the steering wheel and in dependence upon the vehicle speed. Thus the function generator 50 contains a series of maps held in read-only memory with an abscissa of torque and an ordinate of current command Imc for varying curves of vehicle velocity such that a vehicle velocity of zero for a particular torque produces a greater current command signal than does a torque signal at a velocity of say 100 kilometers per hour. The maps in the function generator are such that signals indicative of left or right hand turns of the steering wheel are adduced as is evidenced from the pictorial representation of the maps shown in the block of function generator 50. As will be seen from the maps shown in the block of function generator 50 if a vehicle speed of zero is taken as a reference current command value this value is decreased for a particular torque as the vehicle speed increases so that a weaker amount of assisting effort is provided by the motor 11 for a particular steering wheel operation and thereby providing greater steering wheel feel of the road surface as the speed of the vehicle increases.

Assuming, for example, the steering wheel is turned clockwise so the wheels are turned to the right through the steering column 3 and the rack and pinion 5 and rack 6. Such a motion of the steering column 3 is sensed by the angle sensor 22 which may be similar to the angle sensor described in U.S. Pat. No. 4,086,533.

The output from the steering column angle sensor 22 after being analogue/digital converted is applied to a self-centering command generating circuit 51 which is a circuit effectively representing steering angle as an abscissa with a self-centering current command Imb as an ordinate inter-related by a characteristic providing a greater self-centering current Imb as steering angle deviation from a straight ahead position is provided. Thus the purpose of the self-centering command generaor circuit 51 is to provide a current signal to self-center the steering wheel after it has been rotated, the magnitude of the self-centering current being determined in accordance with the particular requirements of a vehicle and its steering train components.

Output from the function generator Imc is subtracted from the current output Imb from the self-centering command generator circuit 51 in the circuit 52. It will of course be appreciated that because the output currents from the generator 50 and 51 may be of different signs in dependence upon the direction the steering wheel is turned so addition may be effected by circuit 52. The steering assistance current command value given by the function generator 50 is thus combined with the restoration controlling current command signal produced by the self-centering command generating circuit 51 in such a way that if the steering wheel is rotated from a straight ahead position when the driver removes his hands from the steering wheel then the steering wheel will return to a self-centred, i.e. straight ahead position. The circuit 52 thus performs the expression $$Imo = Imc - Imb \tag{1}$$

the output current Imo is applied to the current command generator circuit 53 which again is a series of maps held in read-only memory. In this respect the maps held in the current command generator circuit 53 have a sense direction similar to the maps in function generator 50 and self-centering command generator circuit 51 and the maps of circuit 53 have an abscissa of Imo, an ordinate of maximum current command Imc with inter-linking characteristic curves of velocity such that for a particular current Imo the current Imc is maximum for a vehicle velocity of zero and diminishes with increasing vehicle speed. It will thus be seen from FIG. 3 that output from the vehicle speed circuit 24 is also applied to the current command generator circuit 53. The circuit 53 therefore limits the maximum current command that is issued by the circuit 52 in accordance with the vehicle speed.

The output current Imc from the current command generating circuit is applied to the differential compensating circuit 54 (which will be described later herein in detail) which adds the signal Imc with a derivative of the current command signal to thereby provide a stabilising compensation for the power assistance steering apparatus. The signal output Imco from the differential compensating circuit is digital/analogue converted by circuit 27 and applied to the current control circuit 28 comprising a differential amplifier 281 receiving input from the circuit 27 on its non-inverting input and a fed back signal from the current detector 30 through a current detector amplifier 282 on its inverting input. Output from the differential amplifier 281 is applied via a duty control oscillator 283 to an NPN transistor chopper 29, the emitter of the transistor chopper 29 being connected to the negative terminal of the battery 31 and the collector of the transistor chopper 29 being connected to the current detector 30. The operation of the current control circuit 28 is that it controls the duty cycle of the chopper 29 in accordance with the current command output value Imco outputted from the differential compensating circuit 54. More specifically, the duty cycle command for rendering the output from the current detector 30 substantially equal to the differential compensating circuit output current Imco is issued to correspondingly control the chopper circuit 29 and to thereby allow the electric motor 11 to be driven for assisting the steering wheel turning moment. The current from the motor 11 is smoothed by the choke 60 and limited by a diode 61 having the cathode thereof connected to the positive terminal of battery 31 and the anode thereof connected to the collector of transistor chopper 29.

The differential compensating circuit 54 will now be described in greater detail.

Figure 4:
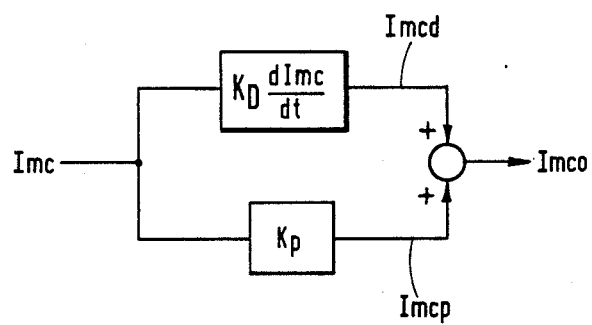
FIG. 4 shows a block diagram demonstrating an arrangement for providing differential compensation in accordance with this invention.

FIG. 4 shows a block circuit diagram for implementing the required differential compensation.

If Imco = the current command signal
Imcd = the differential of Imc × a differentiation gain $K_D$
Imcp = a proportional current value representative of Imc × a constant proportional gain Kp
then the output current value Imco is given by the following:

$$Imcd = K_D \frac{dImc}{dt} \tag{2}$$

$$Imco = KpImc + K_D \frac{dImc}{dt} \tag{3}$$

Processing is performed in a microcomputer according to the equations (2) and (3) as follows.

$$Imcd(n) = [Imc(n) - Imc(n-1)] \times K_D \tag{4}$$

$$Imcp(n) = Imc(n) \times Kp \tag{5}$$

$$\begin{aligned} Imco(n) &= Imcp(n) + Imcd(n) \\ &= Imc(n) \times Kp + [Imc(n) - Imc(n-1)] \times K_D \end{aligned} \tag{6}$$

n is indicative of the present cycle and (n−1) is representative of the immediately previously inputted current command Imco.

Figure 7:
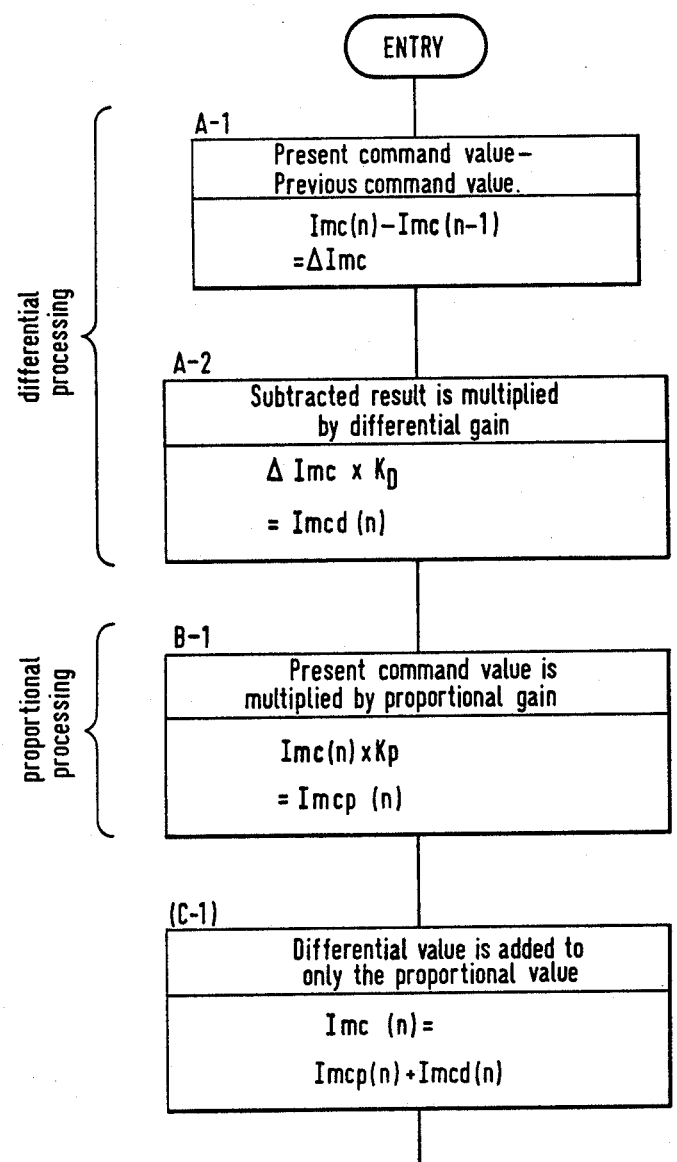
FIG. 7 shows a flow chart by which the differential compensation of this invention is derived.

A flow chart of the software for processing the equations (4)-(6) is shown in FIG. 7 from which it will be noted that the difference between the presently inputted command Imc(n) and the immediately previously inputted command Imc(n−1) is obtained each cycle of the processing due to the software and the difference Imc is multiplied by the differential gain $K_D$. The current Imc(n) is then multiplied by the constant Kp to provide Imcp(n) and the differential value is subsequently added to the proportional value to provide Imco(n) of equation (6).

Figure 5:
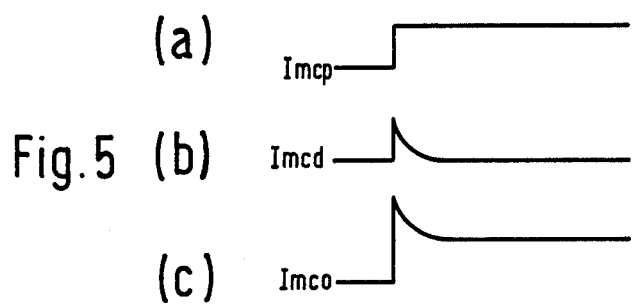
FIG. 5(a), (b), (c) show waveforms illustrating the effect of the differential compensation.

The waveforms of the currents of FIG. 4 are shown in FIG. 5. Thus upon a step-like change of the current Imc the differentiated value of Imc×differential gain $K_D$=Imcd is added to the command value Imc×proportional gain Kp=Imcp to provide Imco. The time constant of the differentiated pulse in FIG. 5(b) is 5 milliseconds in a currently preferred embodiment.

Figure 6:
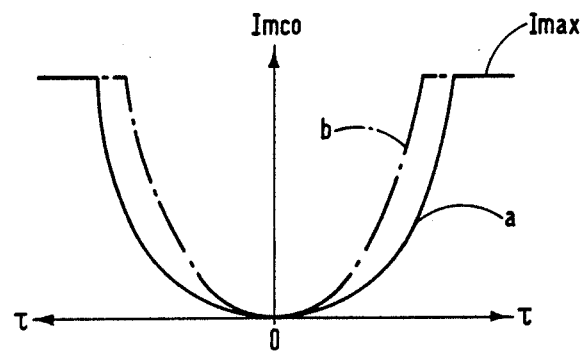
FIG. 6 shows an operational characteristic of the control apparatus of the invention.

FIG. 6 shows the characteristics of the current command Imco along an ordinate with an abscissa of torque about a zero point, the characteristic curves being given for left and right hand torque movements. The characteristic represented in solid lines by curve a shows current Imc produced when the steering wheel is rotated slowly from which it will be seen that the current command varies as a function of the torque and in such a circumstance the current command Imc is not added with its derivative Imcd and such a command is referred to as the basic current command. On the other hand, the curve represented in chain dotted line b is the sum of the basic current command value plus the derivative thereof, as a result of which the current command value Imco is increased. The magnitude of the increase can be adjusted by correspondingly varying the gain of differentiation $K_D$. As will be seen from FIG. 6, when the basic command value, represented by curve a is small, the derivative thereof (reflected in the characteristic of curve b) is small while the derivative is increased in proportion to the increase in the current command Imco. In FIG. 6 it will be observed that Imax represents the maximum limit imposed on the current command currents which in the preferred embodiment is dependent upon vehicle speed. The characteristic of FIG. 6 shows that for a steady curve turn the twist in the steering column goes to zero, the torque sensor output also goes to zero so that on a long steady turn the power assistance is diminished.

From the foregoing it will be appreciated that compensation of instability in the motor current which takes place due to frictional resistance causing delay in the operation of the power steering system is accomplished by adding the derivative Imcd leading by 90° in phase relative to the current command value Imc to the basic current command value Imc and by appropriately selecting the gain of differentiation $K_D$.

In the embodiment described above in which the leading compensation is performed by utilising the derivative of the current command in dependence upon the current command for the electric motor the torque command value is made proportional to the current command independent of the magnitude of the sensed steering wheel torque whereby the compensating effect produced by the circuit 54 enhances stability of steering.

In the above description the signal command for the power steering apparatus has been assumed to be the torque command signal derived from detection of the torsional moment of the steering wheel. However it will be appreciated that other types of command signal may be employed as the manipulation command, such as by utilising solely the steering angle sensor wherein the motor current command is generated in accordance with the steering angle command.

Although the present invention has been described in conjunction with a DC motor 11 for providing the steering assistance, the invention can also be performed by using an AC motor such as an induction motor or the like.

We claim:

1. An electric power steering apparatus comprising an electric motor means for providing steering assistance to a vehicle steering mechanism which includes a steering wheel, force determining means for determining a force applied to the steering wheel, a function generator means connected to the force determining means for generating a non-linear signal representative thereof, said non-linear signal being applied to a differentiating and summing means for differentiating said nonlinear signal and adding thereto said non-linear signal thereby producing a differential compensation signal which is applied to a control means for controlling the current of said electric motor means in proportion to said differential compensation signal.

2. An apparatus as claimed in claim 1, wherein vehicle speed detecting means is provided and the function generator means receives inputs from the force determining means and said vehicle speed detecting means, whereby said function generator means provides as an output signal said non-linear signal as a first current command signal which is based upon said inputs and which non-linear signal is arranged to decrease as said vehicle speed increases.

3. An apparatus as claimed in claim 2, wherein the function generator means comprises a read-only memory containing a plurality of characteristic curves each having non-linear characteristics and each having a sense of steering direction.

4. An apparatus as claimed in claim 1, wherein said non-linear signal is a first current command signal.

5. An apparatus as claimed in claim 1, wherein the force determining means is a torque sensor.

6. An apparatus as claimed in claim 3, wherein a steering angle sensor is provided and a generator means is provided for receiving an output from said angle sensor for deriving a steering self-centering signal.

7. An apparatus as claimed in claim 6, wherein an adding means is provided for adding the self-centering signal to the first current command signal to provide a second current command signal.

8. An apparatus as claimed in claim 7, wherein a further read-only memory holding a plurality of characteristic curves is adapted to receive inputs from the adding means and the vehicle speed detecting means, said characteristic curves being representative of said second current command signal and the vehicle velocity, whereby a third current command signal varying in dependence upon said further read-only memory inputs and limited to a predetermined maximum level is arranged to be outputted to said differentiating and summing means.

9. An apparatus as claimed in claim 1, wherein the differentiating and summing means is a microprocessor adapted for the calculation Imco(n)=Imcp(n)+Imcd(n)=Imc(n)×Kp+[Imc(n)−Imc(n−1)]×$K_D$ where Imco is the current command output from the differentiating and summing means, Imcd is the differential of Imc, Kp is a constant representative of proportional gain and $K_D$ is a constant representative of differential gain and n is indicative of the present cycle and (n−1) is representative of the immediately previously inputted current command Imco.

10. An apparatus as claimed in claim 1, wherein the electric motor means is provided in a feed back control loop with the control means which includes a detector means for receiving the differential compensation signal from the differentiating and summing means and for comparing said differential compensation signal with the current of said motor means whereby a compensating signal in dependence upon said comparison is provided to the motor means.

11. An apparatus as claimed in claim 10, wherein a chopper circuit provides a signal having a mark-space ratio to said motor means and said markspace ratio is varied by the compensating signal.

12. An electric power assistance steering apparatus comprising an electric motor means having a controllable current for providing steering assistance to a steering mechanism which includes a steering wheel; torque determining means for determining the torque applied to said steering wheel; a function generator means connected to the output of said force determining means for generating a non-linear assisting current command value in dependence upon a steering effort applied to said steering wheel; a vehicle speed determining means connected for varying the output of said function generator in dependence upon said vehicle speed; a current command addition/subtraction circuit means connected for receiving as an input the output from said function generator; a steering angle sensor means for determining the angle of turn of said steering wheel; a steering self-centering generator circuit means connected for receiving as an input an output signal from the steering angle sensor and for consequently providing an output signal to another input of the current command addition/subtraction circuit means whereby the inputs to said current command addition/subtraction circuit means are added and a resulting signal is applied to a current command generating circuit means for limiting the signal applied thereto; a differential compensating circuit means connected for receiving the output of the current command generating circuit means for performing a differential compensation thereof by adding a derivative of the output of said current command generating circuit means to the output of said current command generating circuit means whereby the output of said differential compensating circuit means is applied as a controlling signal for controlling the current of said electric motor means providing steering assistance.

13. A method of operating an electric power steering apparatus having an electric motor for providing steering assistance to a vehicle steering mechanism which includes a steering wheel, comprising the steps of:
(a) determining a force applied to the steering wheel in a turning motion,
(b) generating a non-linear signal representative of said force,
(c) differentiating said non-linear signal and adding thereto said non-linear signal to thereby produce a differential compensation signal, and
(d) applying said differential compensation signal to control the current of said electric motor providing said steering assistance.

* * * * *